(12) United States Patent
Luo et al.

(10) Patent No.: US 12,091,792 B2
(45) Date of Patent: Sep. 17, 2024

(54) FLASH SPINNING METHOD FOR PREPARING NON-WOVEN FABRICS BASED ON MICROWAVE THERMAL FUSION, MICROWAVE THERMAL FUSION DEVICE, AND NON-WOVEN FABRIC PREPARATION DEVICE

(71) Applicant: Xiamen Dangs New Material Co., Ltd., Xiamen (CN)

(72) Inventors: Zhangsheng Luo, Xiamen (CN); Huifei Zhu, Xiamen (CN); Lijun He, Xiamen (CN)

(73) Assignee: Xiamen Dangs New Material Co., Ltd., Xiamen (CN)

( * ) Notice: Subject to any disclaimer, the term of this patent is extended or adjusted under 35 U.S.C. 154(b) by 0 days.

(21) Appl. No.: 18/401,784

(22) Filed: Jan. 2, 2024

(65) Prior Publication Data
US 2024/0150947 A1 May 9, 2024

Related U.S. Application Data

(63) Continuation of application No. PCT/CN2023/083629, filed on Mar. 24, 2023.

(30) Foreign Application Priority Data

Mar. 28, 2022 (CN) .......................... 202210316584.8

(51) Int. Cl.
*B29C 71/04* (2006.01)
*D01D 5/11* (2006.01)
(Continued)

(52) U.S. Cl.
CPC ........... *D04H 1/724* (2013.01); *D04H 1/4291* (2013.01); *D04H 1/558* (2013.01); *D04H 1/56* (2013.01);
(Continued)

(58) Field of Classification Search
CPC ............ B29C 2035/0855; B29C 71/04; B29K 2023/06; D01D 5/11; D01D 10/02;
(Continued)

(56) References Cited

U.S. PATENT DOCUMENTS

| 2003/0182730 A1* | 10/2003 | Booker, Jr. | .............. B08B 1/00 442/361 |
| 2008/0157442 A1* | 7/2008 | Janssen | .................. D06H 7/223 264/489 |
| 2017/0056257 A1* | 3/2017 | Nishikawa | ............ A61F 13/496 |

FOREIGN PATENT DOCUMENTS

| CN | 110528172 A | 12/2019 | |
| CN | 114657701 A | * 6/2022 | ........... D04H 1/4291 |

OTHER PUBLICATIONS

Translation of CN 114657701 A (published on Jun. 24, 2022).*
(Continued)

*Primary Examiner* — Leo B Tentoni
(74) *Attorney, Agent, or Firm* — Zhigang Ma

(57) ABSTRACT

A flash spinning method for preparing non-woven fabrics based on microwave thermal fusion, a microwave thermal fusion device, and a non-woven fabric preparation device are provided. The flash spinning method includes: step S1, collecting filament bundles to form a non-woven fabric precursor, adding a microwave heating liquid to the non-woven fabric precursor; the microwave heating liquid being configured to absorb microwave energy and convert the microwave energy into thermal energy; and step S2, performing microwave heating on the non-woven fabric precursor containing the microwave heating liquid obtained in the step S1 to obtain a heated non-woven fabric, and performing a hot press forming treatment on the heated non-woven fabric to obtain a finished non-woven fabric. There is no temperature gradient in layers of the non-woven
(Continued)

fabric precursor, thereby significantly improving the peeling strength of the finished non-woven fabric.

6 Claims, 1 Drawing Sheet

(51) Int. Cl.
| | |
|---|---|
| *D01D 10/02* | (2006.01) |
| *D01D 10/06* | (2006.01) |
| *D01F 6/04* | (2006.01) |
| *D04H 1/4291* | (2012.01) |
| *D04H 1/558* | (2012.01) |
| *D04H 1/56* | (2006.01) |
| *D04H 1/724* | (2012.01) |
| *D04H 3/007* | (2012.01) |
| *D06M 10/00* | (2006.01) |
| *D06M 11/05* | (2006.01) |
| *D06M 13/144* | (2006.01) |
| *D06M 13/148* | (2006.01) |
| *D06M 13/184* | (2006.01) |
| *D06M 13/188* | (2006.01) |
| *B29C 35/08* | (2006.01) |

(52) U.S. Cl.
CPC ... *D06M 10/003* (2013.01); *B29C 2035/0855* (2013.01); *B29K 2023/06* (2013.01); *D10B 2321/021* (2013.01)

(58) Field of Classification Search
CPC ........ D01D 10/06; D01F 6/04; D06M 10/003; D06M 11/05; D06M 13/144; D06M 13/148; D06M 13/184; D06M 13/188; D10B 2321/021
USPC ........... 264/13, 211.12, 211.14, 211.17, 234, 264/331.17, 489; 8/115.6
See application file for complete search history.

(56) References Cited

OTHER PUBLICATIONS

Xiamen Dangs New Material Co., Ltd. (Applicant), Claims for PCT/CN2023/083629, Mar. 24, 2023.
ISA (CNIPA), Written Opinion of the International Searching Authority (WO/ISA) for PCT/CN2023/083629, Jun. 27, 2023.

* cited by examiner

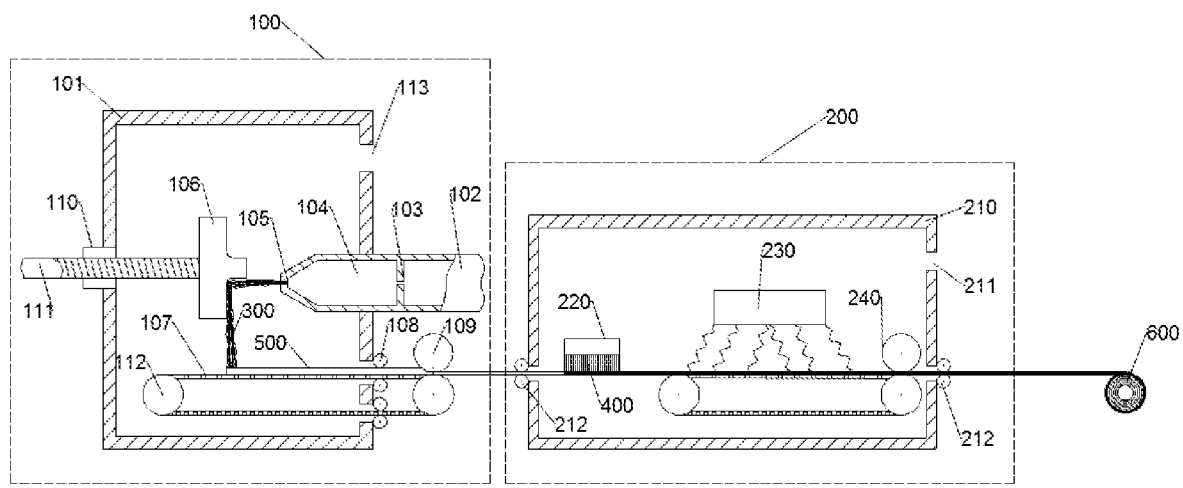

FLASH SPINNING METHOD FOR PREPARING NON-WOVEN FABRICS BASED ON MICROWAVE THERMAL FUSION, MICROWAVE THERMAL FUSION DEVICE, AND NON-WOVEN FABRIC PREPARATION DEVICE

TECHNICAL FIELD

The disclosure relates to the technical field of flash spinning, and particular to a flash spinning method for preparing non-woven fabrics based on microwave thermal fusion, a microwave thermal fusion device, and a non-woven fabric preparation device.

BACKGROUND

Non-woven fabrics, also known as nonwovens, are composed of directional or random fibers, which have the characteristics of moisture resistance, breathability, flexibility, lightweight, non-combustible, easy decomposition, non-toxic and non-irritating, rich colors, low price, and recyclability.

Non-woven fabrics generally use chemical fibers or plant fibers as raw materials. At present, polymer solutions used in flash spinning technology are also raw materials of non-woven fabrics. The flash spinning technology is as follows: a high polymer solution is extruded under a high pressure above its solvent boiling point, the extruded polymer solution forms a fine stream, a solvent of the fine stream undergoes flash evaporation when the pressure suddenly decreases, and a high polymer of the fined stream is solidified to form filaments (i.e., fibers). A spinning method that performs flash evaporation on a solvent and cools the solvent to form filaments is known as a solution flash spinning method. Specifically, a process of preparing filaments of the flash spinning technology requires that the high polymer and the solvent will not be decomposed at a temperature above the boiling point of the solvent, and the solvent is easy to be evaporated.

As a method of producing non-woven fabrics, the flash spinning technology includes main processes as follows: a high polymer is dissolved in a solvent to form a high polymer solution, the high polymer solution is sprayed from a spinneret hole into a medium area which has a different temperature or pressure with a previous area, thereby forming a fine stream; the solvent in the fine stream undergoes flash evaporation, changes an original shape of the fine stream and takes away heat; the solute (i.e. the high polymer in the fine stream) rapidly cools down after precipitation to form solvent airflows and filament bundles with an ultra-fine three-dimensional network structure, that is, when the high polymer solution leaves the spinneret hole, the solvent is rapidly evaporated to form long filament bundles with a network structure composed of monofilaments with a micrometer or submicron size; then, by depositing and collecting these filament bundles in a certain way, the collected filament bundles can be hot pressed into non-woven fabrics.

For a method of preparing non-woven fabrics by depositing and collecting filament bundles and performing a hot press forming treatment on the collected filament bundles, although a traditional flash spinning method for preparing non-woven fabrics by using a hot pressing roller is simple and convenient, a finished non-woven fabric is easy to be layered, and a peeling strength of layers in the finished non-woven fabric is poor due to a poor thermal conductivity of the raw material (typically, polyethylene used in the flash spinning technology) of the finished flash-spun non-woven fabric; furthermore, there is a temperature gradient between an outer layer and an inner layer of the non-woven fabric, which results in that a binding force of the outer layer is greater than that of the inner layer.

In order to overcome the shortcomings of the method for preparing non-woven fabrics by using the hot pressing roller, a microwave heating method is selected in the art to replace the method of using the hot pressing roller. Characteristics of the microwave heating method are as follows: microwaves are generated inside a heated object, a heat source comes from the inside of the object, and the heating is uniform. A half-cooked phenomenon that the outer layer is burnt while the inner layer is not cooked is avoided, which facilitates improving the product quality. Meanwhile, the heating time is greatly shortened due to the uniform heating, the heating efficiency is high, and the product yield is improved. The inertia of microwave heating is very small, which can realize a rapid control of temperature rise and fall, and is conducive to continuous production and automatic control. By using microwave heating to replace the traditional hot roll heating in a flash spinning process of preparing non-woven fabrics, the peeling strength of the finished non-woven fabric will be improved.

However, based on the properties of common raw materials of non-woven fabrics (such as polyethylene), some non-woven fabrics have the problem of weak absorption of microwave energy, which will also affect the uniformity of microwave heating in non-woven fabrics. When the uniformity of microwave heating in a non-woven fabric is poor in a forming process, a temperature gradient between an outer layer and an inner layer of the non-woven fabric will increase, and a peeling strength of the non-woven fabric will be poor.

A Chinese patent with a publication number of CN107513196B and a publication date of Dec. 26, 2017 discloses a method for efficiently heating a high polymer by microwave. The method includes: adding a small amount of a dielectric loss ceramic material with high microwave absorbing efficiency into a high polymer or its monomer or its oligomer, so that the traditional microwave transparent high polymer with low dielectric loss, its monomer, and its oligomer unable to be heated with microwave can be rapidly heated under the action of microwave. However, in a flash spinning process, since a component ratio of the polymer solution and process conditions are relatively strict, it is difficult to directly add a dielectric loss ceramic material with high microwave absorbing efficiency to the flash spinning process according to the disclosed scheme, and it is also difficult to screen out a suitable dielectric loss ceramic material with high microwave absorbing efficiency for preparing non-woven fabrics.

SUMMARY

To solve the problem of a poor peeling strength of existing non-woven fabrics mentioned in the background technology above, the disclosure provides a flash spinning method for preparing a non-woven fabric based on microwave thermal fusion, and the flash spinning method includes:

step S1, collecting filament bundles and laying the collected filament bundles to form a non-woven fabric precursor, adding a microwave heating liquid to the non-woven fabric precursor; the microwave heating liquid being configured to absorb microwave energy and convert the microwave energy into thermal energy; and step S2, performing microwave heating on the non-woven fabric precursor added with the microwave heating liquid obtained in the step S1 to obtain a product (also referred to as a heated non-woven fabric), and performing a hot press forming treatment on the product to obtain a finished non-woven fabric (i.e., the non-woven fabric)

Specifically, the microwave heating liquid is a polar solvent with a strong microwave energy absorption ability.

In an embodiment, a surface tension of the microwave heating liquid is in a range of 20 millinewtons per meter (mN/m) to 73 mN/m.

In an embodiment, an atmospheric boiling point of the microwave heating liquid is greater than or equal to a melting point of the non-woven fabric precursor.

In an embodiment, a difference between the atmospheric boiling point of the microwave heating liquid and the melting point of the non-woven fabric precursor is in a range of −10 Celsius degrees (° C.) to 10° C.

In an embodiment, the microwave heating liquid includes one or more selected from a group consisting of alcohols, carboxylic acids and water.

In an embodiment, the microwave heating liquid is composed of 1-pentanol and ethanol, and a weight ratio of the 1-pentanol to the ethanol is (40-95):10.

In an embodiment, in the step S2, a microwave frequency of the microwave heating is in a range of 300 megahertzes (MHz) to 25000 MHz, and a difference between a boiling point of the microwave heating liquid and a boiling point of the non-woven fabric precursor in a microwave heating room is in a range of −5° C. to 5° C.

In an embodiment, before the non-woven fabric precursor is added with the microwave heating liquid, the non-woven fabric precursor undergoes a pre-pressed forming treatment. Preferably, the non-woven fabric precursor is hot-rolled and pre-pressed by a pre-forming roller.

The disclosure further provides a microwave thermal fusion device. The microwave thermal fusion device is configured to perform the flash spinning method for the preparing non-woven fabric based on microwave thermal fusion. The microwave thermal fusion device includes a microwave shielding box, a microwave generator, and a spray device for spraying the microwave heating liquid on the non-woven fabric precursor. The microwave generator and the spray device are disposed in the microwave shielding box.

The disclosure further provides a non-woven fabric preparation device. The non-woven fabric preparation device includes a flash spinning filament preparation device and the microwave thermal fusion device Based on the above technical solutions, compared with the prior art, the flash spinning method for preparing non-woven fabrics based on microwave thermal fusion provided by the disclosure has the following beneficial effects.

For the finished non-woven fabric prepared by the flash spinning method of the disclosure, there is no temperature gradient in layers of the non-woven fabric precursor while there is a temperature gradient existed in a non-woven fabric prepared by a traditional hot press forming method. Therefore, a connection strength between the filament bundles is more uniform and firmer, thereby significantly improving the peeling strength of the finished non-woven fabric.

Other features and beneficial effects of the disclosure will be described in a subsequent introduction, and will be partially apparent from the specification or understood through the implementation of the disclosure. The purpose and other beneficial effects of the disclosure can be achieved and obtained through the structures specifically pointed out in the specification, claims, and the drawing.

BRIEF DESCRIPTION OF DRAWING

In order to more clearly illustrate embodiments of the disclosure or the technical solutions in the prior art, the following is a brief introduction to a drawing used in the description of the embodiments or the prior art. Apparently, the drawing in the following description is an embodiment of the disclosure. For those of ordinary skill in the art, other drawings may be derived from the drawing. Positional relationships described in the following description of the drawing, unless otherwise specified, are based on the orientation in which components are depicted in the drawing.

FIGURE illustrates a side sectional view of a non-woven fabric preparation device provided by an embodiment of the disclosure.

DESCRIPTION OF REFERENCE NUMERALS

100—flash spinning filament preparation device; 200—microwave thermal fusion device; 300—filament bundles; 400—microwave heating liquid; 500—non-woven fabric precursor; 600—finished non-woven fabric; 101—outer box; 102—spinning unit; 103—pressure reducing plate; 104—low temperature-pressure area; 105—spinneret hole; 106—deflection plate; 107—collection surface; 108—first sealing roller; 109—pre-forming roller; 110—bearing; 111—rotating shaft; 112—driving shaft; 113—spinning gas recycling hole; 210—microwave shielding box; 220—spray device; 230—microwave generator; 240—forming roller; 211—recycling hole; 212—second sealing roller.

DETAILED DESCRIPTION OF EMBODIMENTS

In order to make purposes, technical solutions, and advantages of the embodiments of the disclosure clearer, the technical solutions of the embodiments of the disclosure will be clearly and completely described below in conjunction with the drawing of the embodiments. Apparently, the described embodiments are a part of but not all of the embodiments of the disclosure. The technical features designed in the different embodiments of the disclosure described below can be combined with each other as long as they do not conflict with each other. Based on the embodiments of the disclosure, all other embodiments obtained by those of ordinary skill in the art without creative work should belong to the scope of protection of the disclosure.

In the description of the disclosure, it should be noted that all terms (including technical terms and scientific terms) used in the disclosure have the same meanings as those generally understood by those skilled in the art, and these terms should not be considered as limitations of the disclosure. These terms should be further understood that these terms used herein have the same meanings with these terms used in the specification and the prior art, and are not to be taken in an idealized or overly formal sense except where expressly defined in the disclosure.

A flash spinning method for preparing non-woven fabrics based on microwave thermal fusion is provided by the disclosure. The flash spinning method of the disclosure includes:

step S1, collecting filament bundles 300 and laying the collected filament bundles 300 to form a non-woven fabric precursor 500, adding a microwave heating liquid 400 to the non-woven fabric precursor 500; the microwave heating liquid 400 being configured to absorb microwave energy and convert the microwave energy into thermal energy; and step S2, performing microwave heating on the non-woven fabric precursor 500 containing the microwave heating liquid 400 obtained in the step S1 to obtain a product (also referred to as a heated non-woven fabric), and performing a hot press forming treatment on the product to o a finished non-woven fabric 600 (i.e., the non-woven fabric).

The microwave heating liquid 400 is a polar solvent with a strong microwave energy absorption ability.

Specifically, in the flash spinning method for preparing non-woven fabrics based on microwave thermal fusion, a non-woven fabric with weak microwave energy absorption ability needs to be processed before performing the microwave heating, the microwave heating liquid 400 is added to the non-woven fabric precursor 500 while the microwave heating liquid 400 is configured to absorb microwave energy and convert the microwave energy into thermal energy. The microwave heating liquid 400 wets inner fibers of the non-woven fabric precursor 500. After the non-woven fabric precursor 500 is heated by microwave, the microwave heating liquid 400 in the non-woven fabric precursor 500 absorbs microwave energy and the temperature rises, and the microwave heating liquid 400 transmits heat to the fibers of the non-woven fabric precursor 500. The microwave heating liquid 400 is evaporated when it reaches a boiling point, and the fibers in the non-woven fabric precursor 500 are uniformly heated to or close to a melting point temperature of the fibers before performing a hot press forming treatment. Since there is no temperature gradient between an outer layer and an inner layer of the non-woven fabric precursor 500 compared to a non-woven fabric obtained by traditional hot press forming method, a connection strength between the fibers is more uniform and firmer, ultimately improving the peeling strength of the finished non-woven fabric 600.

Specifically, in the step S1, for the selection of the microwave heating liquid 400, a polar solvent with a strong microwave energy absorption ability is selected as the microwave heating liquid 400. Preferably, a surface tension of the microwave heating liquid 400 is low to help the microwave heating liquid 400 to penetrate into the non-woven fabric precursor 500, and the surface tension of the microwave heating liquid 400 is in a range of 20 mN/m to 73 mN/m. Preferably, an atmospheric boiling point of the microwave heating liquid 400 is greater than or equal to a melting point of the non-woven fabric precursor 500. In other embodiments, a difference between the atmospheric boiling point of the microwave heating liquid 400 and the melting point of the non-woven fabric precursor 500 is in a range of −10° C. to 10° C. An optimal atmospheric temperature of the microwave heating liquid 400 is within a certain range. When the atmospheric boiling point of the microwave heating liquid 400 is too high, it may lead to high condensation and recycled costs of the microwave heating liquid 400, and may also cause mutual melting and fusion of the non-woven fabric fibers. However, when the atmospheric boiling point of the microwave heating liquid 400 is too low, it is necessary to adjust the pressure in the microwave heating room significantly during the microwave heating to transmit sufficient heat to the non-woven fabric precursor 500, which is costly.

For a non-woven fabric made of high-density polyethylene, the microwave heating liquid 400 includes one or more selected from a group consisting of alcohols, carboxylic acids and water. Specifically, the alcohols include existing monobasic alcohol or polyol solutions such as 1-pentanol, ethanol, ethylene glycol, glycerol, etc. The carboxylic acids include acetic acid, propionic acid, etc. Preferably, the microwave heating liquid 400 is composed of 1-pentanol and ethanol, and a weight ratio of the 1-pentanol to the ethanol is (40-95):10. The 1-pentanol and the ethanol form an azeotropic mixture (that two are infinitely miscible), and the mixture can wet and penetrate into fibers of the inner layer of the non-woven fabric precursor 500. The permeability of the mixture is good, the microwave energy absorption ability of the mixture is high, the atmospheric boiling point of the mixture is close to the optimal temperature of the microwave heating fusion process used in the non-woven fabric made of high-density polyethylene, and no particularly large pressure or vacuum is needed in the microwave heating fusion process. The inner layer of the finished non-woven fabric 600 obtained by spraying the mixture and performing the microwave heating on the non-woven fabric precursor 500 eliminates a temperature gradient that exists in the traditional hot press forming method. The connection strength between the fiber bundles (also referred to as filament bundles 300) is uniform and firm, ultimately significantly improving the peeling strength of the finished non-woven fabric 600. Preferably, in the mixture, the weight ratio of the 1-pentanol to the ethanol is 90:10.

In the step S1, preferably, the minimum amount of the microwave heating liquid 400 added to the non-woven fabric precursor 500 is 5% of the mass per unit area of the non-woven fabric precursor 500, and the maximum amount of the microwave heating liquid 400 added to the non-woven fabric precursor 500 is limited based on a situation that the non-woven fabric precursor 500 can absorb the microwave heating liquid 400 to a saturation state. Preferably, the amount of the microwave heating liquid 400 added to the non-woven fabric precursor 500 is in a range of 10 g/m 2 to 120 g/m$^2$.

In the step S2, preferably, a microwave frequency of the microwave heating is in a range of 300 megahertzes (MHz) to 25000 MHz, a duration of the microwave heating is in a range of 1 minute (min) to 3 min. In some embodiments, the microwave frequency of the microwave heating can be 433 MHz, 915 MHz, 2450 MHz, 5800 MHz, or 22125 MHz. Preferably, a difference between a boiling point of the microwave heating liquid 400 and a boiling point of the non-woven fabric precursor 500 in a microwave heating room is in a range of −5° C. to 5° C.

Furthermore, in the step S2, preferably, a temperature for the secondary hot press forming treatment is in a range of 140° C. to 150° C., and the pressure for the secondary hot press forming treatment is in a range of 4 megapascals (MPa) to 6 MPa.

Preferably, before adding the microwave heating liquid 400 to the non-woven fabric precursor 500, a pre-pressed forming treatment (also referred to as a primary hot press forming treatment or a first hot press forming treatment) needs to be performed on the non-woven fabric precursor 500. The non-woven fabric precursor 500 is pre-pressed to facilitate subsequent processing. Specifically, the non-woven fabric precursor 500 can be pre-formed by hot rolling with a preform roller 109, with a temperature for the primary hot press forming treatment in a range of 140° C. to 150° C. and a pressure in a range of 4 MPa to 6 MPa.

The disclosure further provides a microwave thermal fusion device 200. The microwave thermal fusion device 200 is configured to perform the flash spinning method for preparing the non-woven fabric based on microwave thermal fusion mentioned above. The microwave thermal fusion device 200 includes a microwave shielding box 210, a microwave generator 230, and a spray device 220 for spraying the microwave heating liquid 400 on the non-woven fabric precursor 500. The microwave generator 230 and the spray device 220 are disposed in the microwave shielding box 210.

Referring to the FIGURE, the non-woven fabric precursor 500 enters the microwave shielding box 210. When the composition of the non-woven fabric precursor 500 has a weak absorption ability to microwave energy, the microwave heating liquid 400 sprayed by the spray device 220 wets fibers of the inner layer of the non-woven fabric precursor 500, and the microwave heating liquid 400 in the non-woven fabric precursor 500 absorbs microwave energy through the microwave irradiation generated by the microwave generator 230. When the temperature of the microwave heating liquid 400 rises through absorbing the microwave energy and reaches its boiling point, filament bundles 300 composed of the fibers of the non-woven fabric precursor 500 are uniformly heated to reach or approach a melting point temperature of the filament bundles 300, thereby obtaining a heated non-woven fabric. Then the heated non-woven fabric is pressed by a forming roller 240 to form a finished non-woven fabric 600. Therefore, the fibers of the inner layer of the finished non-woven fabric 600 are firmly connected, and the peeling strength of the finished non-woven fabric 600 is improved.

Preferably, the microwave shielding box 210 of the microwave thermal fusion device 200 defines a recycling hole 211. When in use, the microwave heating liquid 400 in the non-woven fabric precursor 500 is evaporated when it reaches its boiling point, and the gaseous microwave heating liquid 400 can be recycled through the recycling hole 211. The recycling hole 211 cannot only be used to recycle the gaseous microwave heating liquid 400, but also to control the gas pressure in the microwave shielding box 210 through the recycling hole 211, thereby adjusting the boiling point of the microwave heating liquid 400 and indirectly controlling a temperature of fibers in the non-woven fabric precursor 500.

Preferably, the microwave thermal fusion device 200 further includes a hot pressing mechanism for performing the secondary hot press forming treatment on the non-woven fabric precursor 500 after the microwave heating, and the hot pressing mechanism is disposed in the microwave shielding box 210.

Specifically, referring to the FIGURE, the hot pressing mechanism can be a forming roller 240. The hot pressing mechanism is disposed in the microwave shielding box 210, so that the non-woven fabric precursor 500 after the microwave heating can be hot pressed quickly, which is beneficial to improve the performance of the finished non-woven fabric 600. It should be noted that, according to the above design concept, other types of hot pressing mechanisms may be used to perform a hot press forming treatment on the non-woven fabric precursor 500 after the microwave heating, including but not limited to the forming roller 240 described in the embodiment.

Preferably, the microwave shielding box 210 defines an inlet and an outlet, and the inlet and the outlet are both provided with a pair of second sealing rollers 212. The non-woven fabric precursor 500 enters the microwave shielding box 210 through the second sealing rollers 212 at the inlet, then the non-woven fabric precursor 500 is processed by the microwave heating and the hot press forming treatment to obtain a finished non-woven fabric 600, and the finished non-woven fabric passes out between the second sealing rollers 212 at the outlet. The second sealing rollers 212 for sealing the inlet and the outlet are beneficial for improving the sealability of the microwave shielding box 210.

Referring to FIGURE, the disclosure also provides a non-woven fabric preparation device. The non-woven fabric preparation device includes a flash spinning tow preparation device 100 for preparing filament bundles 300 and the microwave thermal fusion device 200 as described above. When in use, the flash spinning filament preparation device 100 is configured to prepare, collect, and lay the filament bundles 300 to obtain the non-woven fabric precursor 500. Then, the non-woven fabric precursor 500 is heated and hot-pressed by the microwave thermal fusion device 200 to prepare the finished non-woven fabric 600.

Specifically, the flash spinning filament preparation device 100 is an existing device. The flash spinning filament preparation device 100 includes an outer box 101, a spinning unit 102, a pressure reducing plate 103, a low temperature-pressure area 104, a spinneret hole 105, a deflection plate 106, a collection surface 107, a first sealing roller 108, a pre-forming roller 109, a bearing 110, a rotating shaft 111, a driving shaft 112, a spinning gas recycling hole 113, and so on. The connection and positional relationships between the mechanism and components, a working principle, and a working process of the flash spinning filament preparation device 100 belong to the prior art and will not be repeated here.

It should be noted that based on the above design concept, those skilled in the art can choose other applicable models and types of existing flash spinning filament preparation device 100, which is not limited to the flash spinning filament preparation device 100 described in the above scheme.

Embodiment 1

The flash spinning method for preparing non-woven fabrics based on microwave thermal fusion provided by the disclosure includes the following steps.

(1) Preparation of filament bundles 300 and a non-woven fabric precursor 500:

A preparation process of a spinning solution: high-density polyethylene (HDPE) with a melt index of 8 g/10 min is selected as a solute for flash spinning. The melting point of HDPE is about 135° C. Dichlorofluoromethane (R22) and tetrafluorodichloroethane (R114) are selected as solvents for flash spinning. Nitrogen (N2) is selected as a pressurized gas for dissolving. Specifically, HDPE, R22, and R144 (a weight ratio of HDPE:R22:R144 is 6:33:11) are dissolved and stirred under a pressure of 6 MPa by introducing $N_2$ and at 220° C. to prepare the spinning solution.

A preparation process of the filament bundles 300 and the non-woven fabric precursor 500: a flash spinning device filament preparation device 100 is used to prepare the filament bundles 300. The spinning solution is sprayed out from a spinning nozzle, the solvents of the spinning solution are evaporated instantly, and the polymer of the spinning solution is cooled and solidified to form the fiber bundles (i.e., the filament bundles 300). The fiber bundles settles and condenses on a collection surface 107 to form a fiber network (i.e., the non-woven fabric precursor 500). Specifically, a diameter of a spinneret hole 105 of the spinning nozzle is 0.5 millimeters (mm), a spinning speed is 12000 m/min, and a weight of the fiber network condensed on the collection surface 107 is about 70 g/m².

(2) The primary hot press forming treatment of the non-woven fabric precursor 500: the non-woven fabric precursor 500 is hot-rolled and prefabricated into a thin sheet through a pre-forming roller 109. Specifically, a temperature for the primary hot press forming treatment is 140° C. and a pressure for the primary hot press forming treatment is 4 MPa.

(3) Preparation of a finished non-woven fabric 600: the non-woven fabric precursor 500 enters into a microwave thermal fusion device 200; a microwave heating liquid 400 is sprayed on the non-woven fabric precursor 500; then the non-woven fabric precursor 500 added with the microwave heating liquid 400 is performed with microwave heating to obtain a heated non-woven fabric; the heated non-woven fabric is performed with a secondary hot press forming treatment to obtain the finished non-woven fabric 600.

Specifically, the microwave heating liquid 400 is composed of 1-pentanol and ethanol, and a weight ratio of the 1-pentanol to the ethanol is 90:10. The ethanol is 95% industrial alcohol with a surface tension of about 22.3 mN/m, and an atmospheric boiling point of the ethanol is about 78° C. A surface tension of the 1-pentanol is about 27.15 mN/m, and an atmospheric boiling point of the 1-pentanol is about 137.5° C. The spraying amount of the microwave heating liquid 400 is about 50 g/m². The microwave frequency of the microwave heating is 2450 MHz. The pressure in the microwave shielding box 210 (also referred to as the microwave heating room mentioned above) is controlled to make the boiling point of the microwave heating liquid 400 be about 130° C. A duration of the microwave heating is 1 min. The pressure for the secondary hot press forming treatment is 4 MPa, and a temperature for the secondary hot press forming treatment is 140° C.

Embodiment 2

The preparation of the filament bundles 300 and the non-woven fabric precursor 500 and the primary hot press forming treatment of the non-woven fabric precursor 500 in the embodiment 2 are consistent with those in the embodiment 1.

Preparation of the finished non-woven fabric 600 (this step is consistent with that in the embodiment 1, except that the microwave heating liquid 400 in embodiment 2 is 1-pentanol): a microwave heating liquid 400 is sprayed on the non-woven fabric precursor 500; then the non-woven fabric precursor 500 added with the microwave heating liquid 400 is performed with microwave heating to obtain a heated non-woven fabric; the heated non-woven fabric is performed with a secondary hot press forming treatment to obtain the finished non-woven fabric 600.

Specifically, the microwave heating liquid 400 is 1-pentanol. A surface tension of the microwave heating liquid 400 is about 27.5 mN/m, and an atmospheric boiling point of the 1-pentanol is about 137.5° C. The spraying amount of the microwave heating liquid 400 is about 50 g/m². The microwave frequency of the microwave heating is 2450 MHz. The pressure (i.e., the gas pressure) in the microwave shielding box 210 is 0.09 MPa. A duration of the microwave heating is 2 min. The pressure for the secondary hot press forming treatment is 4 MPa, and a temperature for the secondary hot press forming treatment is 140° C.

Embodiment 3

The flash spinning method for preparing non-woven fabrics based on microwave thermal fusion in the embodiment 3 differs from that of the embodiment 1 in the following content:

In the step of preparing the finished non-woven fabric 600, the microwave heating liquid 400 is composed of 1-pentanol and ethanol, and a weight ratio of the 1-pentanol to the ethanol is 45:10. The ethanol is 95% industrial alcohol with a surface tension of about 22.3 mN/m, and an atmospheric boiling point of the ethanol is about 78° C. A surface tension of the 1-pentanol is about 27.15 mN/m, and an atmospheric boiling point of the 1-pentanol is about 137.5° C. The spraying amount of the microwave heating liquid 400 is about 50 g/m². The microwave frequency of the microwave heating is 22125 MHz. The pressure in the microwave shielding box 210 is controlled to make the boiling point of the microwave heating liquid 400 be about 130° C. A duration of the microwave heating is 3 min. The pressure for the secondary hot press forming treatment is 6 MPa, and a temperature for the secondary hot press forming treatment is 150° C.

Comparative Embodiment 1

The preparation process and conditions of filament bundles 300 and the non-woven fabric precursor 500 in the comparative embodiment 1 are completely the same as those in the embodiment 1. The difference between the comparative embodiment 1 and the embodiment 1 is as follows.

Specifically, the comparative embodiment 1 uses a traditional hot press forming method to perform a hot press forming treatment on the non-woven fabric precursor 500, thereby obtaining the non-woven fabric 600. A temperature for the hot press forming treatment is 149° C., and a pressure for the hot press forming treatment is 6 MPa.

Comparative Embodiment 2

The preparation process and conditions of filament bundles 300 and the non-woven fabric precursor 500 in the comparative embodiment 2 are completely the same as those in the embodiment 1. The difference between the comparative embodiment 2 and the embodiment 1 is as follows.

Specifically, in the step of preparing of the finished non-woven fabric 600, the microwave heating liquid 400 is not sprayed on the non-woven fabric precursor 500, and the non-woven fabric precursor 500 is performed with the microwave heating directly to obtain a heated non-woven fabric. Then the heated non-woven fabric is performed with secondary hot press forming treatment to obtain the finished non-woven fabric 600. Furthermore, the microwave frequency of the microwave heating is the same with that in the embodiment 1. A temperature for the secondary hot press forming treatment is 140° C., and a pressure for the secondary hot press forming treatment is 4 MPa.

The finished non-woven fabrics 600 obtained in the embodiment 1, the embodiment 2, the embodiment 3, the comparative embodiment 1, and the comparative embodiment 2 undergo performance tests, and results of the performance tests are shown in TABLE 1:

TABLE 1

| Group | Weight (g/m²) | Peeling strength (N/2.5 cm) | Hydrostatic pressure (Pa) |
| --- | --- | --- | --- |
| Comparative embodiment 1 | 60.3 | 1.8 | 13850 |
| Comparative embodiment 2 | 60.3 | 1.9 | 14030 |
| Embodiment 1 | 60.4 | 3.8 | 16830 |
| Embodiment 2 | 60.3 | 3.3 | 14880 |

TABLE 1-continued

| Group | Weight (g/m²) | Peeling strength (N/2.5 cm) | Hydrostatic pressure (Pa) |
|---|---|---|---|
| Embodiment 3 | 60.4 | 2.7 | 13850 |
| Test standard | — | GB/T 451.2-2002, ASTM D2724 | GB/T 4744-2013 |

As shown in TABLE 1, the peeling strengths and the hydrostatic pressures of the embodiment 1 and the embodiment 2 are both greater than those of the comparative embodiment 1 and the comparative embodiment 2. In addition, the peeling strength and hydrostatic pressure of the embodiment 1 are better than those of the embodiment 2 and the embodiment 3. The peeling strength and the hydrostatic pressure of the comparative embodiment 2 are slightly higher than those of the comparative embodiment 1.

To sum up, compared with the prior art, the flash spinning method for preparing non-woven fabrics based on microwave thermal fusion provided by the disclosure adds the microwave heating liquid 400 to heat the non-woven fabric precursor 500 with a low microwave absorption ability, and a temperature gradient between the outer layer and inner layer of the non-woven fabric precursor 500 is eliminated in the forming process due to the uniformity of microwave heating, thereby significantly improving the peeling strength of the finished non-woven fabric 600.

In addition, the polymer in the spinning solution in the above embodiments is PE (this means the material of filament bundles 300 is PE). According to the above design concept, in other embodiments, the polymer in the spinning solution can be one selected from a group consisting of polyolefins, polyesters, polyurethane, polyamides, etc., among which polyolefins can be polyethylene, polypropylene, and polymethylpentene, etc.

Similarly, the preparation methods for filament bundles 300 and the non-woven fabric precursor 500 are all prior art, and those skilled in the art can make reasonable adjustments according to actual needs in other embodiments.

The method of the disclosure is not only suitable for the preparation of non-woven fabrics based on flash spinning technology, but also suitable for the preparation of non-woven fabrics of other technical types, film compounding and other adjacent fields, and the principles are the same.

The term "atmospheric pressure" referred to a standard atmospheric pressure (101.325 kPa, or 0.101325 MPa), and the atmospheric boiling point refers to a boiling point at a standard atmospheric pressure.

In addition, those skilled in the art should understand that, although there are many problems in the prior art, each embodiment or technical solution of the disclosure can improve the problems only in one or several aspects, and it is not necessary to solve all the technical problems listed in the prior art or the background at the same time. It should be understood by those skilled in the art that what is not stated in a claim should not be taken as a limitation of the claim.

Although terms such as filament bundle, non-woven fabric precursor, and microwave heating are used frequently in the disclosure, the possibility of using other terms is not excluded. These terms are used merely for convenience in describing and explaining the nature of the disclosure. To interpret these terms as any additional limitation is contrary to the spirit of the disclosure. The terms "first", "second" and the like in the disclosure are used to distinguish between similar objects, but not to describe a particular order or sequence.

Finally, it should be noted that the above embodiments are only used to illustrate the technical solutions of the disclosure, not to limit the disclosure. Although the disclosure has been described in detail with reference to the above embodiments, those of ordinary skill in the art should understand that the technical solutions described in the above embodiments can still be modified, and some or all of the technical features of the above embodiments can be equivalently replaced. These modifications or replacements do not cause the essence of the corresponding technical solutions to depart from the scope of the technical solutions of the embodiments of the disclosure.

What is claimed is:

1. A flash spinning method for preparing a non-woven fabric based on microwave thermal fusion, comprising:
    step S1, collecting filament bundles and laying the collected filament bundles to form a non-woven fabric precursor, adding a microwave heating liquid to the non-woven fabric precursor; wherein the microwave heating liquid is configured to absorb microwave energy and convert the microwave energy into thermal energy; and
    step S2, performing microwave heating on the non-woven fabric precursor added with the microwave heating liquid obtained in the step S1 to obtain a product, and performing a hot press forming treatment on the product to obtain the non-woven fabric;
    wherein the microwave heating liquid is a polar solvent with a microwave energy absorption ability;
    wherein the microwave heating liquid is composed of 1-pentanol and ethanol, and a weight ratio of the 1-pentanol to the ethanol is (40-95):10.

2. The flash spinning method for preparing the non-woven fabric based on the microwave thermal fusion as claimed in claim 1, wherein a surface tension of the microwave heating liquid is in a range of 20 millinewtons per meter (mN/m) to 73 mN/m.

3. The flash spinning method for preparing the non-woven fabric based on the microwave thermal fusion as claimed in claim 1, wherein an atmospheric boiling point of the microwave heating liquid is greater than or equal to a melting point of the non-woven fabric precursor; or a difference between the atmospheric boiling point of the microwave heating liquid and the melting point of the non-woven fabric precursor is in a range of −10 Celsius degrees (° C.) to 10° C.

4. The flash spinning method for preparing the non-woven fabric based on the microwave thermal fusion as claimed in claim 1, wherein in the step S2, a microwave frequency of the microwave heating is in a range of 300 megahertzes (MHz) to 25000 MHz, and a difference between a boiling point of the microwave heating liquid and a melting point of the non-woven fabric precursor in a microwave heating room is in a range of −5° C. to 5° C.

5. The flash spinning method for preparing the non-woven fabric based on the microwave thermal fusion as claimed in claim 1, wherein before adding the microwave heating liquid to the non-woven fabric precursor, the method further comprises: performing a pre-pressed forming treatment on the non-woven fabric precursor.

6. The flash spinning method for preparing the non-woven fabric based on the microwave thermal fusion as claimed in claim 1, wherein a material of the filament bundles is polyethylene (PE).

* * * * *